Nov. 1, 1949   D. MEYER   2,486,862
ELECTRIC RANGE HEATING UNIT
Filed Oct. 12, 1946   2 Sheets-Sheet 1

INVENTOR
DONALD MEYER
BY John W. Michael
ATTORNEY

Nov. 1, 1949  D. MEYER  2,486,862
ELECTRIC RANGE HEATING UNIT
Filed Oct. 12, 1946  2 Sheets-Sheet 2

INVENTOR
DONALD MEYER
By John W. Michael
ATTORNEY

Patented Nov. 1, 1949

2,486,862

UNITED STATES PATENT OFFICE 2,486,862

ELECTRIC RANGE HEATING UNIT

Donald Meyer, Milwaukee, Wis.

Application October 12, 1946, Serial No. 703,070

9 Claims. (Cl. 219—37)

This invention relates to improvements in heating units for electric ranges and includes means for receiving spillage or overflow and a single support with a quick detachable connection for the heating element and is provided with heat reflecting means also serving other functions.

It is one object of the present invention to provide a heating unit for electric ranges in which the heating element is related to a well having a considerable capacity for receiving and retaining any material falling through the heating element.

Another object of the invention is to provide a heating unit for electric ranges in which the heating element is supported only on a pillar extending upwardly within a well below the heating element and which well may be detachable from or integral with the range top or frame parts.

A further object of the invention is to provide a heating unit for electric ranges in which the heating element is supported substantially centrally only and in which means are provided in connection with such support for placing the heating element in a given position and holding the element in such position against rotation.

Another object of the invention is to provide a heating unit for electric ranges in which the heating element is supported only on a single pillar containing a portion of a quick detachable electric connection for the element and in which the connection is protected against spillage or overflow through the heating element.

Another object of the invention is to provide a supporting pillar containing portions of a prong and receptacle connection for the heating element of an electric range heating unit and in which the supporting and connecting parts are so shaped as to minimize the danger of short-circuiting the connection by spillage or overflow from a container placed on the heating element of the unit.

A further object of the invention is to provide a heating unit for electric ranges in which the heating element is connected with the electric circuit by a prong and receptacle type connection with the receptacle sockets so formed as to immediately discharge any material falling therein.

And a further object of the invention is to provide a heat unit for electric ranges, in which the heating element is detachably supported on a single pillar extending from the bottom of a well detachably mounted in the range top and in which a heat reflector coacts with the range top to enclose the joint between the range top and the well.

Objects and advantages, other than those set forth above, will be apparent from the following description when read in connection with the accompanying drawings, in which.

Figure 1:
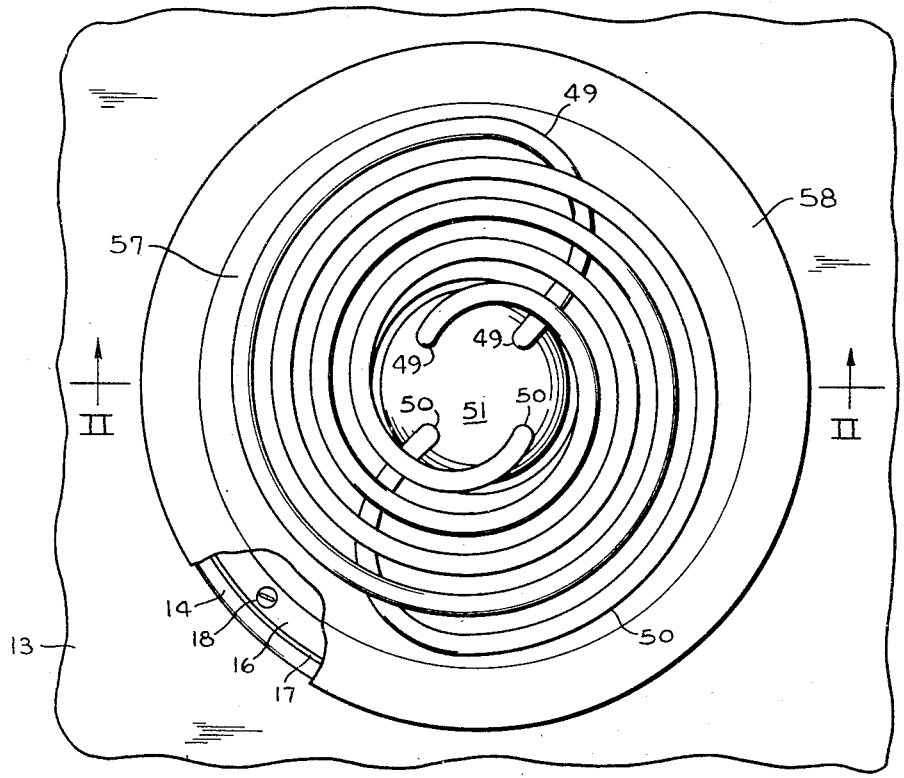
Fig. 1 is a top plan view of the heating unit, with a fragment of a range top.
Figure 2:
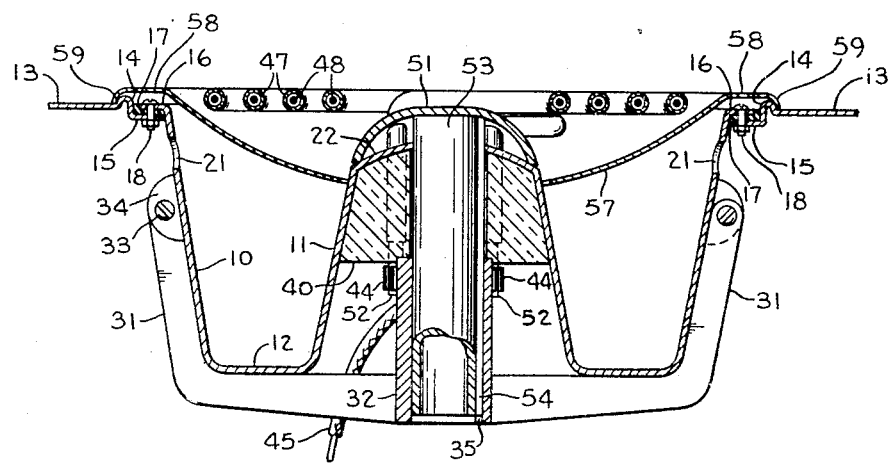
Fig. 2 is a cross-sectional view taken on the vertical plane including line II—II of Fig. 1.
Figure 3:
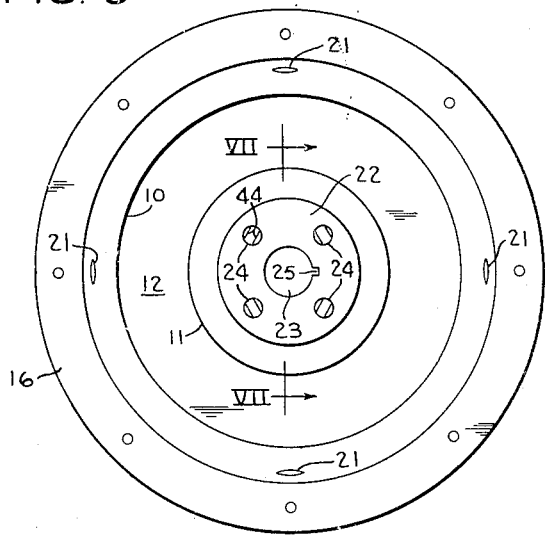
Fig. 3 is a top plan view of the supporting structure and of a portion of a quick detachable connection between the heating element of the unit and an electric supply circuit.
Figure 6:
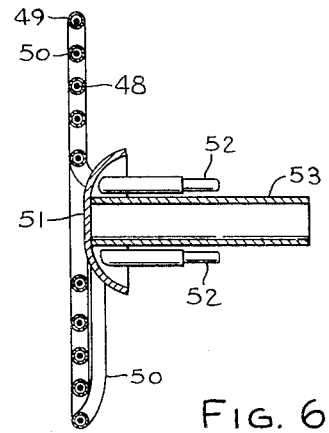
Fig. 6 is a cross-sectional view taken on the plane of line VI—VI of Fig. 5.
Figure 5:
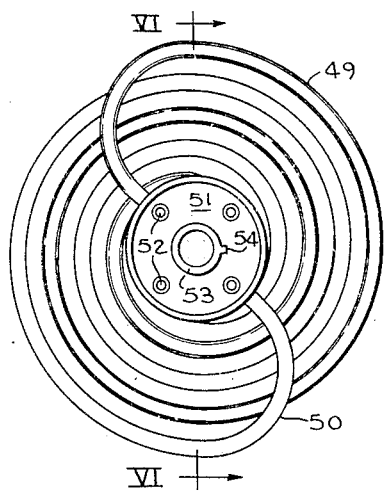
Fig. 5 is a bottom plan view of the heating element of the unit and illustrates a portion of the quick detachable connection for such element.
Figure 4:
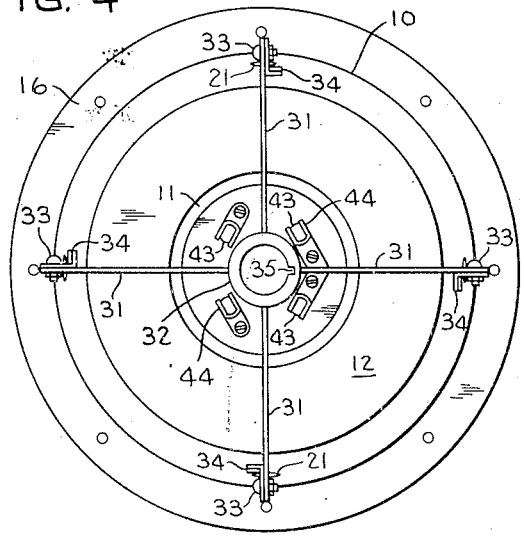
Fig. 4 is a bottom plan view of the supporting and electrical connecting structure for the heating element of the unit.
Figure 7:
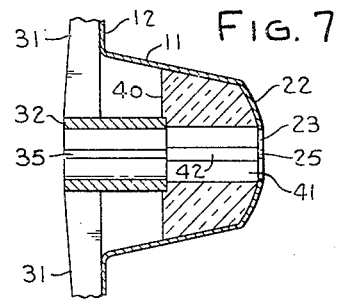
Fig. 7 is a partial cross-sectional view taken on the plane of line VII—VII of Fig. 3.

Generally, the present invention includes a well with only a few perforations adjacent the upper edge and so shaped as to provide a hollow pillar rising centrally within the well and having a hole in the top thereof. An electrical receptacle, with contacts adapted to be connected with an electric circuit, is substantially enclosed by the pillar wall and has a passage registering with the hole in the pillar. The electrical receptacle is supported on a spider-like structure having a tubular body forming an extension of the passage through the receptacle. A heating element has fixed thereon a cap fitting on and covering the end of the pillar whereby the heating element and any weight placed thereon is supported only by the pillar. The electric terminal prongs of the heating element extend from one side of the cap and a post extends from the cap between the prong-like terminals. The post extends through the receptacle and into the spider body in a given and predetermined relation thereto to position the heating element terminals for engagement with the receptacle contacts and to take up any rotational force on the heating element. A heat reflector extends into the well beneath the heating element to serve also as a baffle directing the flow of air, through the perforations in the well wall, along the wall of the well pillar and substantially centrally through the heating element and to inclose the joint between the well outer wall and range top when such parts are separable and not unitary.

Referring particularly to the several drawings, a well is formed with an outer wall 10, an inner wall 11, and a bottom 12 to define substantially a cylindrical space. The well may be formed as a part of the range top 13 or may be made separate. When the wells are separable from the remainder of the range structure, the range top 13 is formed with holes having a peripheral upstanding flange 14 and a depressed flange 15 forming a rabbet receiving a peripheral outwardly directed flange 16 on the well outer wall. A substantially annular plate 17 of heat insulating and heat resistive material is placed in the range top rabbet 15 beneath the well flange 16 for the purpose of preventing the transmission of heat by conduction from the well to the range top, and the well and heat insulator are kept in position by bolts 18.

The outer well walls are perforated by a small number of relatively large air holes 21 formed through the outer well wall 10 and adjacent the well flange 16 and in a particular relation with the inner well wall. The edge of the inner well wall is flanged as at 22 to provide a spherically arcuate surface with an aperture 23 therethrough on the axis of the well, with four holes 24 which are preferably uniformly spaced about the central hole 23 and with a notch 25 extending from the central hole. The hole 23 and notch 25 are adapted to receive portions of the heating element and holes 24 receive the terminals for the heating element. It will be seen that the holes 21 in the outer well wall are below the level of the holes 23 and 24 in the spherical surface 22 of the well pillar so that it is impossible for the well to be filled up sufficiently for liquid to enter the latter holes.

A spider comprising four arms 31 and a tubular body portion 32 is detachably mounted by bolts 33 on brackets 34 extending from the outer surface of the outer well wall 10. The spider body is formed with a keyway groove 35 extending from the interior space of such body. The spider forms a supporting structure for a block of electric and heat resistive insulation 40 shaped to fit into the space defined by the well inner wall 11 and its spherical end 22, which parts are hereinafter called a pillar. The insulation has a central passage 41 therethrough with an internal diameter corresponding substantially to the internal diameter of the hole 23 and the internal diameter of the spider body 32. The wall of the central passage through the insulation block 40 has a groove 42 formed therein to connect the notch 25 in the pillar top 22 with the keyway 35 in the spider body 32. Such groove is preferably larger than either the notch or the keyway for a purpose which will appear hereinafter. The insulation block also has a plurality of holes 43 spaced about the central passage 41 therethrough to register with the holes 24 in the pillar top 22 when the groove 42 is aligned with the notch 25 and the keyway 35. Resilient electrical contact clips 44 are suitably fixed on or in the insulation block 40 to extend about the holes 43 or otherwise to permit contact with electrical conductors extending through such holes. Electrical circuit connections 45 are suitably connected with the contact clips 44 for energizing such clips as desired. In the present instance two single clips are shown to which separate electrical circuit connections are to be made while a third clip is shown as being actually two clips connectible with a common electric circuit connection. It will be seen that the lower end of the holes 43 of the connector insulation are not blocked even by the contacts 44 so that foreign material may pass directly through the holes and contacts into a free space within the range. Creepage of liquid over the wall 11 and the end surface 22 of the pillar is extremely unlikely and certainly will not occur in such quantity as to enter the holes 43.

An electric heating element of any known type, and shown as a well known type in which metal tubing 47 encloses a resistor 48, is formed with two coils 49 and 50 spirally interspaced as is usual, the high resistance electrical conductor for such coils being placed in electrical insulating relation within the enclosing tubing, as is also well known. The ends of the coils 49 and 50 extend through and are fixed in a piece 51 of spherically arcuate shape and of a size to seat on and form a cap for the arcuate top 22 of the pillar in the well. The cap-piece 51 is preferably made of corrosion and heat resistive metal of sufficient thickness to support the heating element coils 49 and 50 and any weight which may be placed thereon. The ends of the electrical conductors are provided with terminals 52 of good electrical conductive material and of such size as to fit into and extend in spaced relation through the holes 24 in the receptacle insulation block and to engage the contact clips 44. It will be understood that any known type of heating element may be used so long as it may be attached to the cap 51 in such manner as to bear the weight of the element plus any weight placed thereon and so long as the electrical terminals may be located centrally of the heating element to pass through the cap.

A post 53, which may be either tubular as shown or solid if desired, is fixed in the concave surface of the cap 51 in substantially a central location and extends between and in the same direction as the terminal prongs 52. The post is of such outer diameter as to fit snugly in the hole 23 in the pillar portion 22 and into the spider body 32 but with clearance in the insulation passage 41. A key 54 extends from the side of the post to fit into the key notch 25 and into the keyway 35 in the spider body. The post, therefore, serves the purposes of positioning the heating element within the well and takes up any rotative forces due to the off center placing of weight on the heating element. Such off center loads are transmitted to the metal of the well near one end of the post and to the spider body at the other end of the post so that the receptacle insulation is not under load and the groove therein is required only to provide a passage for guiding the post into the spider body. No mechanical forces of any kind can be imposed on the terminal prongs and the receptacle contacts and the insulation is required only to support the weight of the contacts and of a portion of the electric leads. As a consequence of the above construction, the receptacle insulation may be chosen for its heat resistive qualities and ease in obtaining the desired shape with no regard for the mechanical strength thereof. The post extends beyond the terminal ends to provide a point of support for the heating element when removed from the unit. Hence, the terminals cannot be damaged by careless removal or by dropping of a heating element.

A heat reflector of generally annular shape and having a bowl portion 57, a peripheral flange portion 58, and a reentrant flange portion 59, extends below the heating element and into the upper part of the well, adjacent to, but in spaced relation to, the well pillar. The edge of the reentrant reflector flange 59 rests on the range top, 13 and preferably fits snugly over the range top flange 14 while the reflector peripheral flange 58 extends over and encloses the joint between the range top and the well. The reflector is made of metal which may be given and which will retain a high polish even though subjected to considerable heat, and the bowl is shaped to produce the maximum reflection of heat waves, as is well known. The reflector is preferably not mechanically attached to the range top but is readily removable so that the reflecting surface may be easily polished whenever desired.

Use of the present structure has shown that a materially greater amount of heat is delivered, for a given rating of heating element, to a utensil placed on the unit than can be obtained from units now in use for the reason that less heat is dissipated to the range structure and to the surrounding space than heretofore. In use, a material quantity of air flows through the holes 21 and about the upper end of the supporting pillar and the electrical receptacle structure. Such current of air aids the reflector in concentrating the heat on or about a utensil and keeps the electrical receptacle cool. Measurements have shown that a heating element of 1000 watts, when completely covered, will produce a temperature of as much as 1036° F. immediately above the reflector as compared to a temperature of only 161° F. about the electrical connector.

It will thus be seen that the present invention provides a structure in which a well receives and retains any spillage or overflow which may be expected in normal usage. Whenever such spillage or overflow occurs, the heating element subassembly and the reflector are easily removable to clean the well. The electrical connector is protected against short circuits due to spillage or overflow and creepage of liquid into such connector is virtually impossible. In any event, liquid penetrating into the connector is immediately discharged from the bottom thereof. Due to the relatively low temperature about the insulating portion of the receptacle, it is no longer necessary to use ceramics for that purpose and the life of the insulation is greatly increased. Replacement of the heating element subassembly no longer requires the services of a skilled person but may be made by any one capable of operating an electric range. All of the weight on the heating element is carried by the well pillar and is only indirectly transmitted to the range structure through the well. It is possible to minimize heat conduction from the heating element to the range structure and at a very low cost. The well pillar is so constructed that the receptacle insulation is protected against excessive heat and is not required to perform any functions other than supporting the electrical contacts and guiding the heating element prongs thereto. Any tendency toward rotation of the heating element, due to off center loading, is prevented by engagement of the post key in the notch in the upper end of the pillar and in the keyway in the spider body. The receptacle portion of the connector is free to move or float as required within the pillar, but is positively positioned by the post key upon placement of the heating element in its required position.

Although but one embodiment of the present invention has been herein illustrated and described, it will be apparent to those skilled in the art that various changes and modifications may be made within the spirit of the invention and the scope of the appended claims.

I claim:

1. In a heating unit for an electric range, a well mounted in the range and defining space shaped substantially as a hollow cylinder to provide a hollow pillar in the well, the well wall being perforated adjacent the top of the pillar and defining a basin below the perforations for retaining material falling thereinto, a heating element supported on the well pillar, electrical prongs extending from the heating element, and an electrical receptacle mounted inside the well pillar and having openings to receive the heating element prongs, the openings in the receptacle being above the perforations in the well wall.

2. In a heating unit for an electric range, a well mounted in the range and formed to provide a hollow pillar with an opening therein, a heating element seated on the well pillar, electrically conductive prongs extending from the heating element, a spider having a tubular body and arms mounted on the well, an electrical receptacle mounted on the spider body and receiving the heating element prongs, the receptacle having a passage therethrough forming an extension of and of greater size than the pillar opening and the interior of the spider body tube, and a post extending from the heating element into the spider body and engaging only the pillar opening and the spider body for positioning the heating element on the well pillar.

3. In a heating unit for an electric range, a well mounted in the range, a heating element supported only by the well, electrically conductive prongs extending from the heating element, a spider having a tubular body and arms mounted on the well, an electrical receptacle mounted on the spider body and receiving the heating element prongs, the receptacle having a passage therethrough forming an extension of the tubular spider body, the passage having a groove and the spider having a keyway formed therein to register with the groove, and a post extending from the spider body for positioning the heating element on the well pillar, the post having a key extending therefrom for reception in the groove and the keyway.

4. A heating unit for an electric range comprising a well mounted in the range and defining a space shaped substantially as a hollow cylinder and providing a hollow pillar in the well, the upper end of the pillar having a hole therethrough, a spider mounted on the well and including a tubular body and arms attached to the side of the well, the pillar hole and the interior of the spider body being equal in size, a heating element seated on the upper end of the well pillar, electrically conductive prongs extending from the heating element, an electric receptacle supported on the spider body within the well pillar and having a passage therethrough registering with and of greater size than the interior of the spider body, the receptacle receiving the heating element prongs, and a post extending centrally from the heating element for insertion through the hole in the upper end of the pillar and through the passage in the receptacle and into the spider body, the post being of a size to fit closely in the pillar hole and in the spider body.

5. A heating unit for an electric range comprising a well mounted in the range and defining a space shaped substantially as a hollow cylinder and providing a hollow pillar in the well, the upper end of the pillar having a hole therethrough with a notch in the periphery of the hole, a spider mounted on the well and including a tubular body with a keyway therein and arms attached to the well, a heating element supported on the well pillar, electrically conductive prongs extending from the heating element, an electrical receptacle supported within the well pillar and having a passage therethrough and a groove extending from the periphery of the passage, the receptacle passage and the groove registering respectively with the hole and the notch in the pillar and with the interior of the spider body and the keyway therein the receptacle receiving the heating element prongs, and a post extending from the heating element for insertion through the pillar hole and the receptacle passage and into the spider body, the post having a key extending therefrom into the notch and the groove and the keyway.

6. A heating unit for an electric range and comprising an imperforate spillage-receiving well mounted in the range and formed to provide a pillar centrally in the well and rising a material distance above the bottom thereof, an imperforate cap fitting on and providing a covering for the pillar, a heating element mounted centrally on the cap and supported only thereby, electrically conductive terminals for the heating element fixed in and extending from the cap, and an electrical receptacle mounted in the pillar for receiving the heating element terminals.

7. A heating unit for an electric range and comprising an imperforate spillage-receiving well mounted in the range and formed to provide a pillar centrally in the well and rising a material distance above the bottom thereof, an imperforate cap fitting on the end of the pillar, a heating element mounted on the cap and supported only thereby, electrically conductive terminals for the heating element and extending through the cap, a post fixed on the cap and extending between and beyond the terminals, an electrical receptacle mounted on the well and providing contacts for the electric terminals, the post extending into the pillar for positioning the terminals relative to the receptacle contacts.

8. A heating unit for an electric range comprising a well mounted in the range and defining a space shaped substantially as a hollow cylinder to provide a hollow pillar inside the well, the well retaining materials falling thereinto, a heating element supported on the well pillar, electrically conductive prongs extending from the heating element, an electrical receptacle mounted in the well pillar to receive the heating element prongs, and a heat reflector mounted on the well and extending beneath the heating element to adjacent the top of the well pillar for shielding the receptacle from heat.

9. A heating unit for an electric range and comprising a well mounted in the range, the well being formed with a central pillar therein and having perforations only adjacent the upper edge thereof for retaining materials falling thereinto, a heating unit supported only by the pillar, electrically conductive prongs extending from the heating element, an electrical receptacle in the upper end of the pillar to receive the heating element prongs, and a heat reflector extending into the well beneath the heating element and adjacent the upper end of the pillar, the heat reflector edge being spaced from the wall of the well pillar for the flow of air through the perforations in the well wall and through the well and the space between the pillar wall and the heat reflector for shielding the receptacle from heat.

DONALD MEYER.

REFERENCES CITED

The following references are of record in the file of this patent:

UNITED STATES PATENTS

| Number | Name | Date |
| --- | --- | --- |
| 1,480,787 | Serrell | Jan. 15, 1924 |
| 1,676,669 | Schaffler | July 10, 1928 |
| 2,325,358 | Andrews | July 27, 1943 |
| 2,370,767 | Backer | Mar. 6, 1945 |

FOREIGN PATENTS

| Number | Country | Date |
| --- | --- | --- |
| 438,547 | Great Britain | Nov. 19, 1935 |